Dec. 22, 1964  A. H. THOMAS ETAL  3,162,518
LEAD REMOVAL DEVICE
Filed July 24, 1963  2 Sheets-Sheet 1
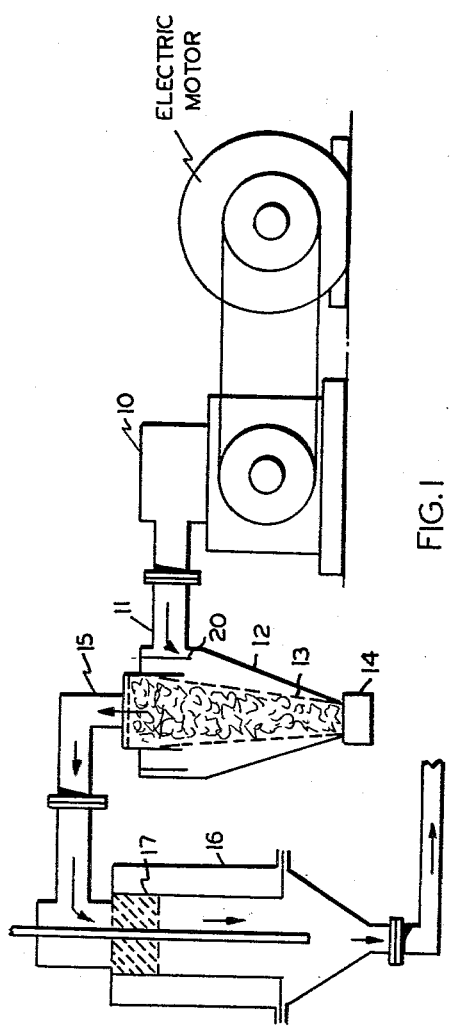
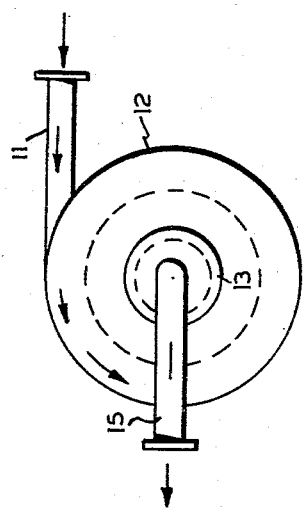
INVENTORS
A. H. THOMAS
W. S. BRIGGS
D. S. HENDERSON
BY
Joseph P. Ugro
ATTORNEY

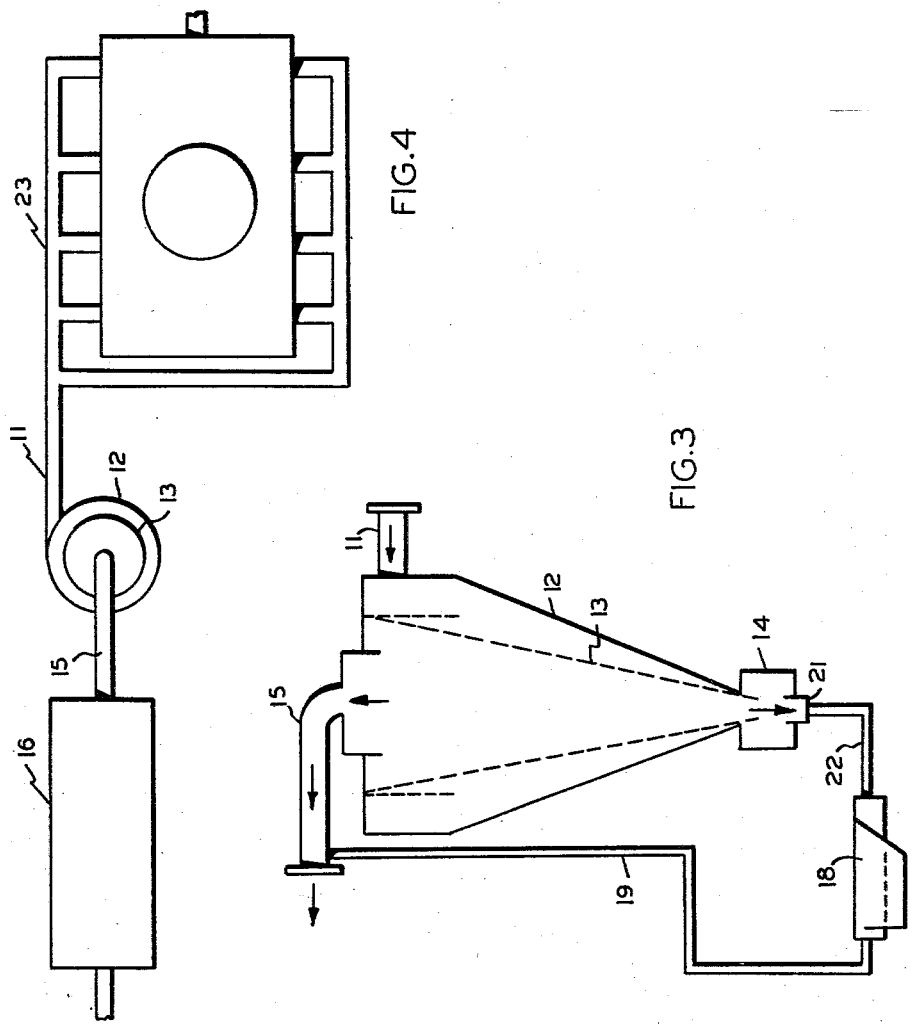

United States Patent Office 3,162,518
Patented Dec. 22, 1964

3,162,518
LEAD REMOVAL DEVICE
Alan H. Thomas, Laurel, Warren S. Briggs, Silver Spring, and Donald S. Henderson, Baltimore, Md., assignors to W. R. Grace & Co., New York, N.Y., a corporation of Connecticut
Filed July 24, 1963, Ser. No. 297,434
1 Claim. (Cl. 55—316)

This invention relates to a device for physically separating lead from auto exhaust gases.

The problem of air pollution has been the object of much study in recent years. It has been found that incompletely burned exhaust gases from automobiles are a major contributor to the pollution problem. Much research is being directed toward finding a method which will ensure complete oxidation of auto exhaust gases before they escape to the atmosphere. One of the most obvious and satisfactory methods for accomplishing this is to pass the incompletely burned gases over an oxidation catalyst thus obtaining complete combustion. However, a significant obstacle to this solution is presented by the lead present in gasoline. The majority of gasoline contains tetraethyl lead as an anti-knock additive. However, it is well known that lead is a catalyst poison. The lead in automobile exhaust quickly poisons and renders useless oxidation catalysts which would otherwise be effective in promoting complete combustion of auto exhaust gases. It would be desirable to somehow separate the lead from the auto exhaust before it reaches the oxidation catalyst.

It is an object of this invention to provide a means whereby lead in auto exhaust gases is physically separated from the gases before they are passed to the catalytic oxidation treatment.

It is another object to provide a device which can be used in conjunction with other lead removal means for increased efficiency.

It is a further object of this invention to remove both metallic lead and soot particles from the combustion gases of internal combustion engines.

The invention is illustrated by the accompanying drawing in which:

FIG. 1 is a side elevational view showing the device inserted in the exhaust system of a single cylinder engine;

FIG. 2 is a top view of the device;

FIG. 3 is a side elevational view of the device in combination with a mechanical lead removal device, and FIG. 4 is a side elevational view showing the device inserted in a standard auto exhaust system.

Referring to FIG. 1, engine 10 supplies the products of combustion via line 11 to cyclone device 12. The gases pass downward through outer chamber 12 then up through lead adsorbent bed 13 and out line 15 into a conventional muffler device 16 containing a catalytic oxidation bed 17.

FIGURE 2 shows the path of the gases entering chamber 12 via line 11, entering bed 13 and exiting via line 15.

FIGURE 3 shows a modification of the device where exhaust gases pass into chamber 12 via line 11, pass downward around chamber 12 and up through bed 13. Part of the gases pass through trap 14 and out through opening 21, then are carried by line 22 to a mechanical lead removal device 18 where additional lead is removed. The gases then pass via line 19 to line 15 where they join the remainder of the gases which pass up through bed 13 and out via line 15 to the catalytic convertor.

FIGURE 4 shows automobile engine 23 from which exhaust is directed via line 11 to cyclone device 12. The exhaust passes down the outer chamber of device 12, up through lead adsorbent bed 13, out via line 15 into a conventional muffler device 16 containing a catalytic oxidation bed.

In operation, gases from engine 10 enter the cyclone 12 through line 11. The gases are directed downward by baffle 20 and swirled through chamber 12 depositing lead on the walls of the chamber. The motion of the gases causes the deposited lead to fall into trap 14. The gases then pass upward through lead adsorbent bed 13. The lead free gases then pass out of the cyclone via line 15 into the muffler system. As shown in FIG. 1, the device is placed on the downstream side of the manifold in such a position that the gases leaving the manifold pass through the lead removal device before going to any other unit. A convenient modification of this arrangement is to allow the gases to pass through a bed of lead adsorbent material and then into the cyclone. If this modification is chosen, the bed of lead adsorbent material in the cyclone can be eliminated if desired.

The lead adsorbent can be any of the well-known materials suitable for this purpose. Suitable substances include, for example, silica-alumina, alumina and alumina impregnated with salts of copper, sodium, molybdenum and vanadium.

This system is especially advantageous in that it can control the heat required in the gases for satisfactory operation of the catalytic convertor. When the gases reach the catalytic convertor, they should be hot enough to allow quick warm-up of the catalyst bed so that the oxidative conversion will reach maximum efficiency in a very short time. However, the gases should not be too hot since this causes rapid deterioration of the catalyst. By using temperature controlling means in conjunction with the device, the gases can be directed to the catalytic converter at any desirable temperature.

What is claimed is:

A device for removing lead particles from auto exhaust gases comprising a source of auto exhaust gases containing lead particles, a cyclone chamber, means for introducing said gases into said chamber in a downward rotational flow pattern, a trap attached at the bottom of said cyclone chamber having an exit aperture in its bottom surface, an inverted cone-shaped lead adsorbent bed extending through the central portion of said chamber from above said trap to an exit aperture at the top of said chamber, a means for directing exhaust from said top exit aperture of said chamber to a conventional automobile muffler system, a means for directing exhaust from said exit aperture at the bottom of said trap to a mechanical lead removal device containing an exit aperture and a means for directing exhaust from said mechanical device to a conventional automobile muffler system.

References Cited by the Examiner
UNITED STATES PATENTS

| | | | |
|---|---|---|---|
| 1,513,035 | 10/24 | Donaldson | 55—329 |
| 1,716,481 | 6/29 | Bilsky. | |
| 2,642,951 | 6/53 | Norton | 55—316 X |
| 3,013,628 | 12/61 | Jacobs et al. | |
| 3,016,108 | 1/62 | Myddelton | 55—387 |
| 3,056,662 | 10/62 | Ridgway. | |

REUBEN FRIEDMAN, *Primary Examiner.*